United States Patent
Ahn et al.

(10) Patent No.: US 8,633,923 B2
(45) Date of Patent: Jan. 21, 2014

(54) BOOST CONVERTER USING FREQUENCY-VARYING OSCILLATION SIGNAL FOR LIQUID CRYSTAL DISPLAY

(75) Inventors: Yong-Sung Ahn, Ansan-si (KR);
Jung-Min Choi, Daejeon-si (KR);
Sang-Rok Cha, Cheongju-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 214 days.

(21) Appl. No.: 12/829,085

(22) Filed: Jul. 1, 2010

(65) Prior Publication Data

US 2011/0273433 A1 Nov. 10, 2011

(30) Foreign Application Priority Data

May 7, 2010 (KR) .................. 10-2010-0042793

(51) Int. Cl.
*G06F 3/038* (2013.01)
*G09G 5/00* (2006.01)

(52) U.S. Cl.
USPC .............................. 345/213; 345/211; 345/87

(58) Field of Classification Search
USPC .......................................... 345/87, 211, 213
See application file for complete search history.

(56) References Cited

U.S. PATENT DOCUMENTS

| | | | | |
|---|---|---|---|---|
| 5,420,640 | A * | 5/1995 | Munich et al. | 348/525 |
| 6,369,665 | B1 * | 4/2002 | Chee et al. | 331/143 |
| 2005/0057551 | A1 * | 3/2005 | Gong et al. | 345/211 |
| 2006/0158136 | A1 * | 7/2006 | Chen | 315/308 |
| 2009/0040160 | A1 * | 2/2009 | Jiang et al. | 345/94 |
| 2009/0140708 | A1 * | 6/2009 | Tateishi et al. | 323/282 |

FOREIGN PATENT DOCUMENTS

| | | |
|---|---|---|
| CN | 1453762 | 11/2003 |
| JP | 2002-252970 | 9/2002 |
| JP | 4148048 | 7/2008 |
| KR | 10-2003-0083922 A | 11/2003 |
| KR | 10-2006-0039987 | 5/2006 |
| KR | 10-2006-0039987 A | 5/2006 |
| TW | 200633596 | 9/2006 |
| TW | I282817 | 5/2007 |
| TW | 200811630 | 3/2008 |
| TW | 200907893 | 2/2009 |
| TW | 200923892 | 6/2009 |

* cited by examiner

*Primary Examiner* — Kwang-Su Yang
(74) *Attorney, Agent, or Firm* — Kile Park Reed & Houtteman PLLC

(57) ABSTRACT

In order that a boost converter of an LDI can reduce electromagnetic interference by generating a panel driving voltage through the use of a variable frequency, while achieving a stable boosting operation using the same frequency whenever each frame begins, an oscillator generates an oscillation signal having a frequency, which varies in a predetermined pattern or hops in a random pattern around a center frequency, and generates an oscillation signal having a preset fixed frequency whenever each frame begins.

6 Claims, 13 Drawing Sheets

FIG. 1 (Conventional Liquid Crystal Display)

FIG. 2 (Conventional Boost Converter Circuit)

(a)

(Waveform View of a Conventional Switching Pulse)

(b)

(Spectrum View of a Conventional Boosting Operation)

BOOST CONVERTER USING FREQUENCY-VARYING OSCILLATION SIGNAL FOR LIQUID CRYSTAL DISPLAY

BACKGROUND OF THE INVENTION

1. Field of the Invention

The present invention relates to a liquid crystal panel driving technology for a liquid crystal display, and more particularly, to a boost converter of a liquid crystal display which reduces electromagnetic interference using a variable frequency when generating a panel driving voltage, and performs a boosting operation in synchronization with a synchronizing signal of image data, thereby achieving a stable boosting operation without exerting an influence on images.

2. Description of the Related Art

FIG. 1 is a block diagram schematically illustrating the configuration of a conventional liquid crystal display. As shown in FIG. 1, the conventional liquid crystal display includes a liquid crystal panel 110 and an LCD driver IC (LDI) 120. On the liquid crystal panel 110, a plurality of gate lines and data lines are arranged perpendicular to each other to define pixel areas in the form of a matrix. The LDI 120 includes a driving circuit unit 121 for supplying driving signals and data signals to the liquid crystal panel 110, and a power supply unit 122 for supplying various power supply voltages required for the driving circuit unit 121.

The driving circuit unit 121 includes a gate driver 121A, a source driver 121B, and a timing controller 121C.

The gate driver 121A outputs a gate driving signal for driving each gate line of the liquid crystal panel 110.

The source driver 121B outputs a data signal to each data line of the liquid crystal panel 110.

The timing controller 121C controls the driving of the gate driver 121A and source driver 121B, while controlling the driving of the power supply unit 122.

The power supply unit 122 includes a power control section 122A, a source-power driving section 122B, and a gate-power driving section 122C.

The power control section 122A controls the driving of the source-power driving section 122B and gate-power driving section 122C under the control of the timing controller 121C.

In this case, the gate-power driving section 122C supplies a gate high voltage $V_{GH}$ and a gate low voltage $V_{GL}$ which are required for the gate driver 121A to generate the gate driving signal.

In addition, the source-power driving section 122B supplies a positive-polarity panel driving voltage VDDP (hereinafter, referred to as a "panel driving voltage VDDP") and a negative-polarity panel driving voltage VDDN, which are required for the source driver 121B to generate the data signal.

FIG. 2 illustrates a boost converter circuit which is included in the source-power driving section 122B of the LDI 120, and outputs a panel driving voltage VDDP. As shown in FIG. 2, the boost converter circuit includes: a field-effect transistor FET1 for driving a reactor L1 in response to a switching pulse LSW; a condenser Cout for storing a voltage which is loaded through a blocking diode D1 from the reactor L1 according to the switching operation of the field-effect transistor FET1; resistors R1 and R2 for dividing a panel driving voltage VDDP, which is output after being stored in the condenser Cout, at a predetermined ratio; and a controller 200 for monitoring the panel driving voltage VDDP through a voltage divided by the resistors R1 and R2 and controlling the switching pulse LSW so as to output the panel driving voltage at a target level.

The field-effect transistor FET1 repeats a series of on/off operations in response to a switching pulse LSW, as shown in FIG. 3(a), which is input to the controller 200. In this case, a boosting voltage loaded from the reactor L1 by a switching operation of the field-effect transistor FET1 is stored in the condenser Cout through the blocking diode D1.

The boosting voltage stored in the condenser Cout through a path as described above is output as the panel driving voltage VDDP.

However, when the amount of current loaded to the outside through the output terminal for the panel driving voltage VDDP is less than that accumulated in the condenser Cout, the panel driving voltage VDDP increases to an unnecessarily high level.

In order to prevent such a matter, the panel driving voltage VDDP output from the condenser Cout is divided into voltages having predetermined levels through the use of resistors R1 and R2, and the controller 200 controls the switching pulse LSW so that a voltage having a target level can be output while monitoring the panel driving voltage VDDP based on the divided voltages.

The switching pulse LSW includes, for example, a pulse-width modulation (PWM) pulse and a pulse frequency modulation (PFM) pulse. When using the PWM pulse, the controller 200 controls the duty ratio of the PWM pulse so that a boosting voltage having a target level can be output. When using the PFM pulse, the controller 200 controls the frequency of the PFM pulse so that a boosting voltage having a target level can be output.

Generally, when the form of a switching pulse LSW to be output has been determined, the controller 200 outputs the switching pulse LSW with the same phase as shown in FIG. 3(a). Accordingly, a periodic boosting operation causes the spectrum to be concentrated to the band of a center frequency f0, as shown in FIG. 3(b).

As described above, according to the conventional boost converter circuit of an LDI system, a switching pulse with the same phase is used as a switching pulse for driving a reactor, and a period boosting operation causes an energy spectrum in an amplified form to be formed, so that the energy spectrum of a harmonic frequency appears in an amplified form, too.

Furthermore, the energy spectrum in an amplified form has a problem in that it causes electromagnetic interference (EMI) with the frequencies of other signals used in the system.

Recently, in order to solve such a problem, a method of generating a switching pulse with the form of a variable frequency so as to generate a spread spectrum has been proposed. However, since switching pulses with mutually different frequencies are used whenever each frame begins, panel driving voltages of different levels little by little on all such occasions, so that there is a problem in that images are unstably displayed.

SUMMARY OF THE INVENTION

Accordingly, the present invention has been made in an effort to solve the problems occurring in the related art, and an object of the present invention is to provide a boost converter of an LDI capable of reducing electromagnetic interference by generating a panel driving voltage through the use of a variable frequency, while achieving a stable boosting operation using the same frequency whenever each frame begins.

An object of the present invention is not limited to the aforementioned object, and other unwritten objects and advantages will become more apparent through the following description.

In order to achieve the above object, according to one aspect of the present invention, there is provided a boost convert including: an oscillator configured to generate an oscillation signal having a frequency, which varies in a predetermined pattern or randomly hops around a center frequency, in synchronization with a synchronizing signal, and to generate an oscillation signal having a preset fixed frequency whenever each frame begins; a controller configured to output a switching signal for generating a required panel driving voltage through use of the oscillation signal output from the oscillator, a voltage detected as a panel driving voltage, and a preset reference voltage; and a driver configured to perform a switching operation on the transistor, which drives the reactor generating the panel driving voltage, through use of the switching signal output from the controller.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
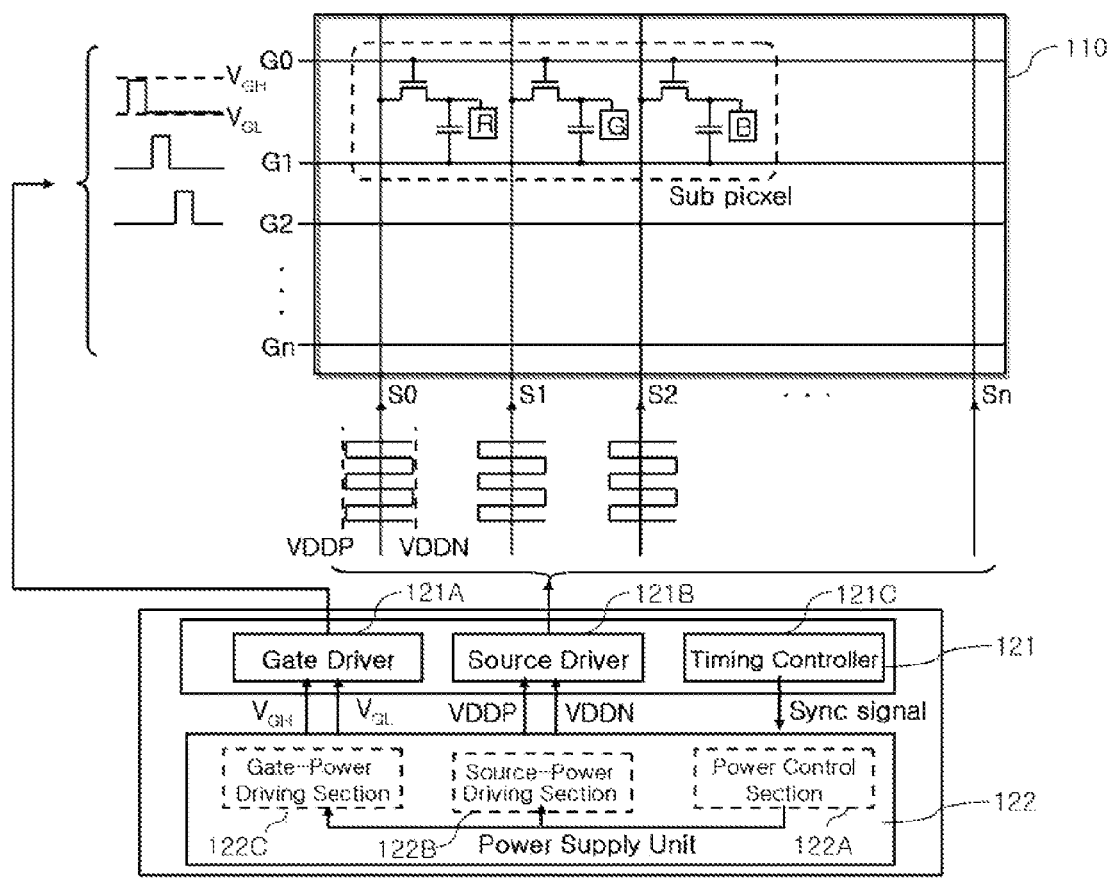
FIG. 1 is a block diagram schematically illustrating the configuration of a conventional liquid crystal display.
Figure 2:
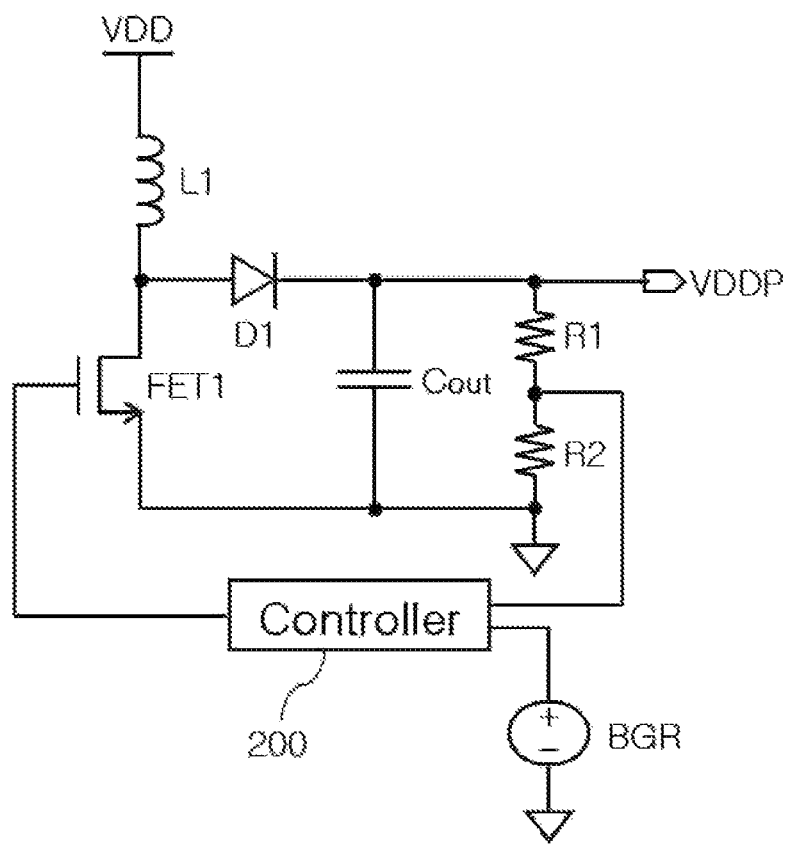
FIG. 2 illustrates a circuit diagram of a boost converter included in an LDI.
Figure 3:
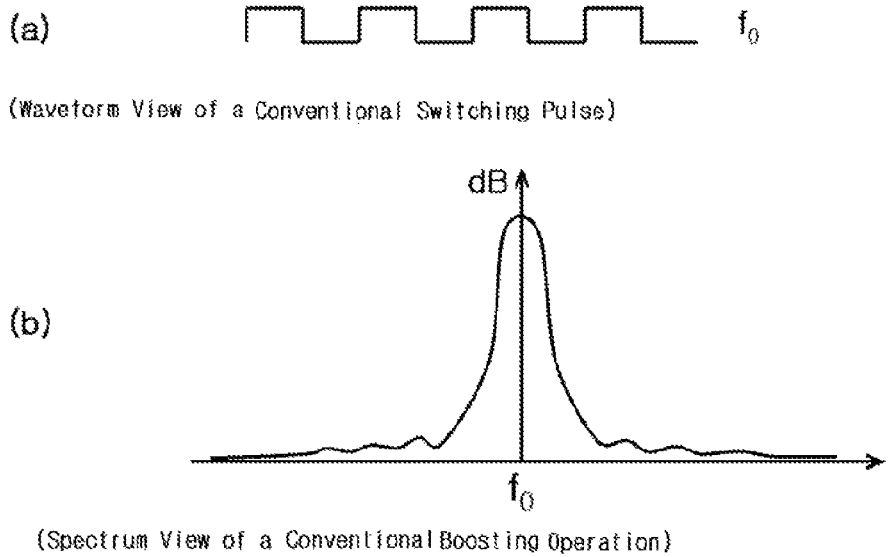
FIG. 3(a) is a waveform view of a switching pulse.
FIG. 3(b) is a view illustrating a spectrum by a conventional boosting operation.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
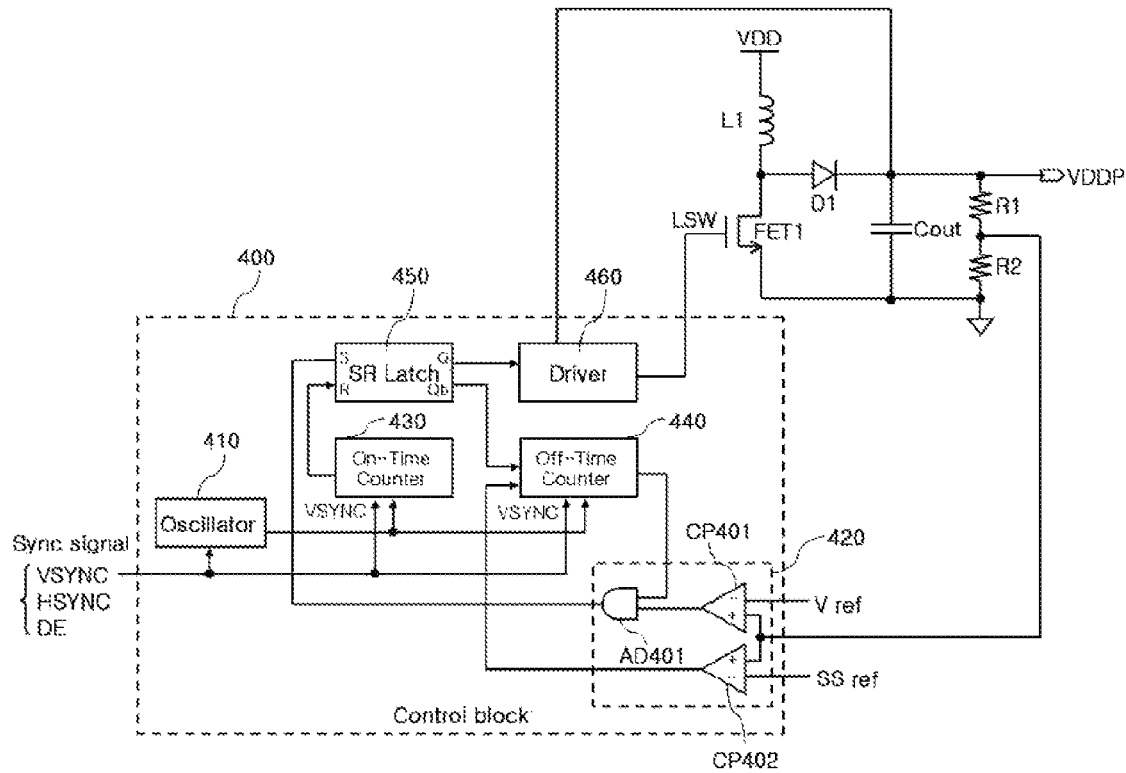
FIG. 4 is a block diagram illustrating the configuration of a boost converter of a liquid crystal display according to an embodiment of the present invention.

FIG. 4 is a block diagram illustrating the configuration of a boost converter of a liquid crystal display according to an embodiment of the present invention. As shown in FIG. 4, the boost converter, which generates a panel driving voltage VDDP by driving a reactor L1 using a field-effect transistor FET1, includes a control block 400, which includes an oscillator 410, a panel-driving-voltage monitoring unit 420, an on-time counter 430, an off-time counter 440, an SR latch 450, and a driver 460.

Figure 5:
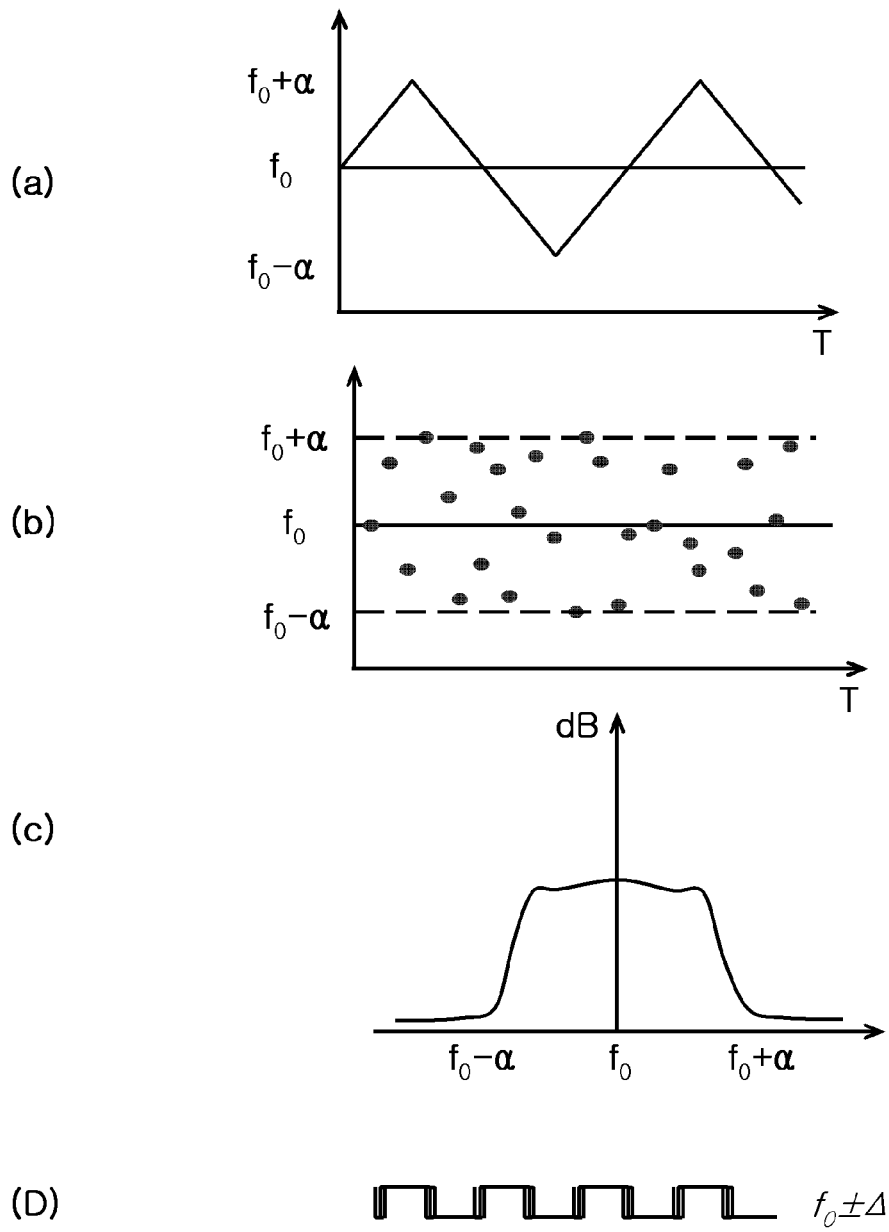
FIG. 5(a) is a graph illustrating a case where a frequency varies in a predetermined pattern according to an embodiment of the present invention.
FIG. 5(b) is a graph illustrating a case where a frequency varies in a random pattern according to an embodiment of the present invention.
FIG. 5(c) is a graph illustrating a spectrum in which energy is spread due to a varied frequency according to an embodiment of the present invention.
FIG. 5(d) is a waveform view illustrating a switching pulse in which a frequency varies according to an embodiment of the present invention.

The oscillator 410 generates an oscillation signal having a frequency which varies in a predetermined pattern around a center frequency $f_0$, as shown in FIG. 5(a), or generates an oscillation signal having a frequency which randomly hops around a center frequency $f_0$, as shown in FIG. 5(b). Accordingly, a spectrum by the boost converter is not concentrated to the frequency band of the center frequency $f_0$, and has a widely spread form, as shown in FIG. 5(c). FIG. 5(d) is a waveform view illustrating a signal which is output in the form of variable frequency from the oscillator 410. In addition, the oscillator 410 generates a preset fixed frequency through the use of a vertical synchronizing signal Vsync whenever each frame begins. Various embodiments of the oscillator 410 will be described later in detail with reference to the accompanying drawings.

The panel-driving-voltage monitoring unit 420 includes comparators CP401 and CP402, and an AND gate AD401. The comparator CP401 compares a panel driving voltage VDDP divided by resistors R1 and R2 with a reference voltage Vref, and outputs a signal according to a result of the comparison. The comparator CP402 compares the panel driving voltage VDDP divided by resistors R1 and R2 with a reference voltage SSref, which has been set for soft start, and outputs a monitoring signal according to a result of the comparison. The AND gate AD401 performs an AND operation on the output signal of the comparator CP401 and the output signal of the off-time counter 440, thereby outputting a monitoring signal.

The on-time counter 430 counts the on-time period of an oscillation signal output from the oscillator 410 after being reset by the vertical synchronizing signal Vsync.

The off-time counter 440 counts the off-time period of an oscillation signal output from the oscillator 410 after being reset by the vertical synchronizing signal Vsync.

The SR latch 450 receives the monitoring signal output from the AND gate AD401 through a set terminal S, receives a signal output from the on-time counter 430 through a reset terminal R, and outputs an error-corrected pulse having the form of a switching pulse LSW.

The driver 460 converts a pulse input from the SR latch 450 into a switching pulse LSW having a form suitable for switching the field-effect transistor FET1, and outputs the switching pulse LSW. The switching pulse LSW output from the driver 460 has the form of a variable frequency, as shown in FIG. 5(d).

The field-effect transistor FET1 repeats a series of on/off operations in response to the switching pulse LSW input from the driver 460. In this case, a boosting voltage loaded from reactor L1 by the switching operation of the field-effect transistor FET1 is stored in the condenser Cout through the blocking diode D1.

The boosting voltage stored in the condenser Cout through the above path is output as a panel driving voltage VDDP.

Figure 6:
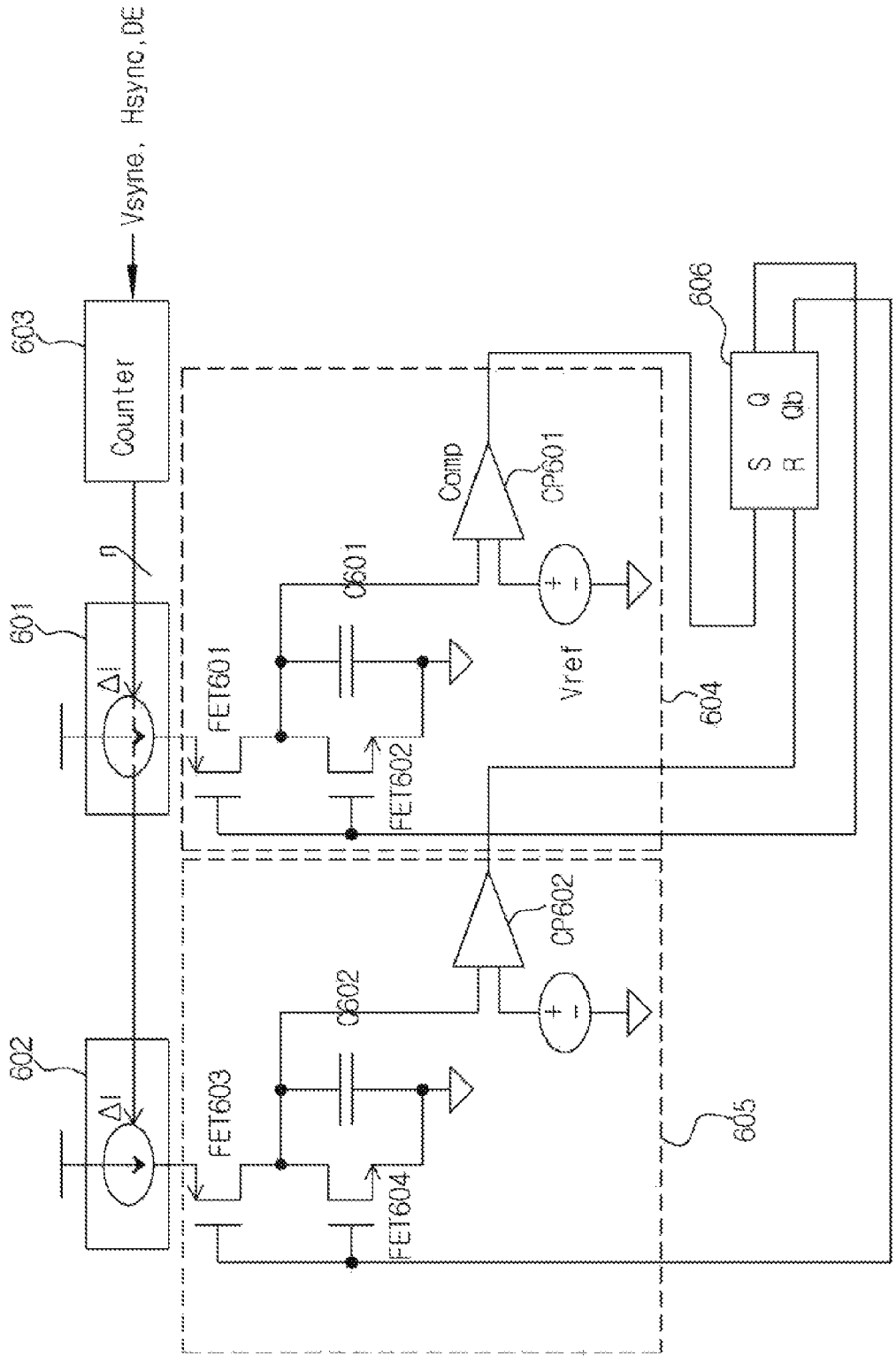
FIG. 6 is a circuit diagram illustrating the configuration of an oscillator according to a first embodiment of the present invention.

FIG. 6 is a circuit diagram illustrating the configuration of the oscillator 410, which operates as described above, according to a first embodiment of the present invention. As shown in FIG. 6, according to the first embodiment of the present invention, the oscillator 410 includes a first current source section 601, a second current source section 602, a counter section 603, a set-signal output section 604, a reset-signal output section 605, and an SR latch 606.

When low and high level signals are input to the set terminal S and reset terminal R of the SR latch 606, respectively, the SR latch 606 outputs low and high level signals through the output terminals Q and Qb, respectively. Accordingly, a transistor FET601 in the set-signal output section 604 is turned on, while a transistor FET602 is turned off. At the same time, a transistor FET603 in the reset-signal output section 605 is turned off, while a transistor FET604 is turned on.

Accordingly, a condenser C601 is charged with voltage supplied from the first current source section 601 through the transistor FET601. A comparator CP601 compares a charged voltage of the condenser C601, which is input through a first input terminal, with a reference voltage, and outputs a high level signal to the set terminal S of the SR latch 606 at the moment when the charged voltage exceeds the reference voltage. At this time, a charged voltage of a condenser C602 is discharged to the ground through the transistor FET604. Thus, a low level signal is input to a first input terminal of a comparator CP602, so that the comparator CP602 outputs a low level signal through an output terminal thereof to the reset terminal R of the SR latch 606. Accordingly, the SR latch 606 outputs high and low level signals through the output terminals Q and Qb, respectively, thereof.

Thereafter, the high and low level signals output from the output terminals Q and Qb of the SR latch 606 turns off the transistor FET601 in the set-signal output section 604, while turning on the transistor FET602. At the same time, the transistor FET603 in the reset-signal output section 605 is turned on, while the transistor FET604 is turned off.

Accordingly, through a procedure as described above, low and high level signals are input to the set terminal S and reset terminal R of the SR latch 606. Therefore, the SR latch 606 outputs low and high level signals through the output terminals Q and Qb, respectively, thereof.

Consequently, the set-signal output section 604 and reset-signal output section 605, which operate as described above, cause high and low level signals to be alternately input to the set terminal S of the SR latch 606, so that the SR latch 606 outputs a square wave having a corresponding frequency through the output terminal Q thereof.

Meanwhile, the counter section 603 controls the amount of current output from the first current source section 601 and second current source section 602 in synchronization with various synchronizing signals (e.g. Vsync, Hsync, DE, etc.) to vary the charging time of the condensers C601 and C602, thereby varying the frequency of a square wave output through the output terminal Q of the SR latch 606, so that a spread spectrum is implemented. Accordingly, electromagnetic interference is reduced.

Figure 7:
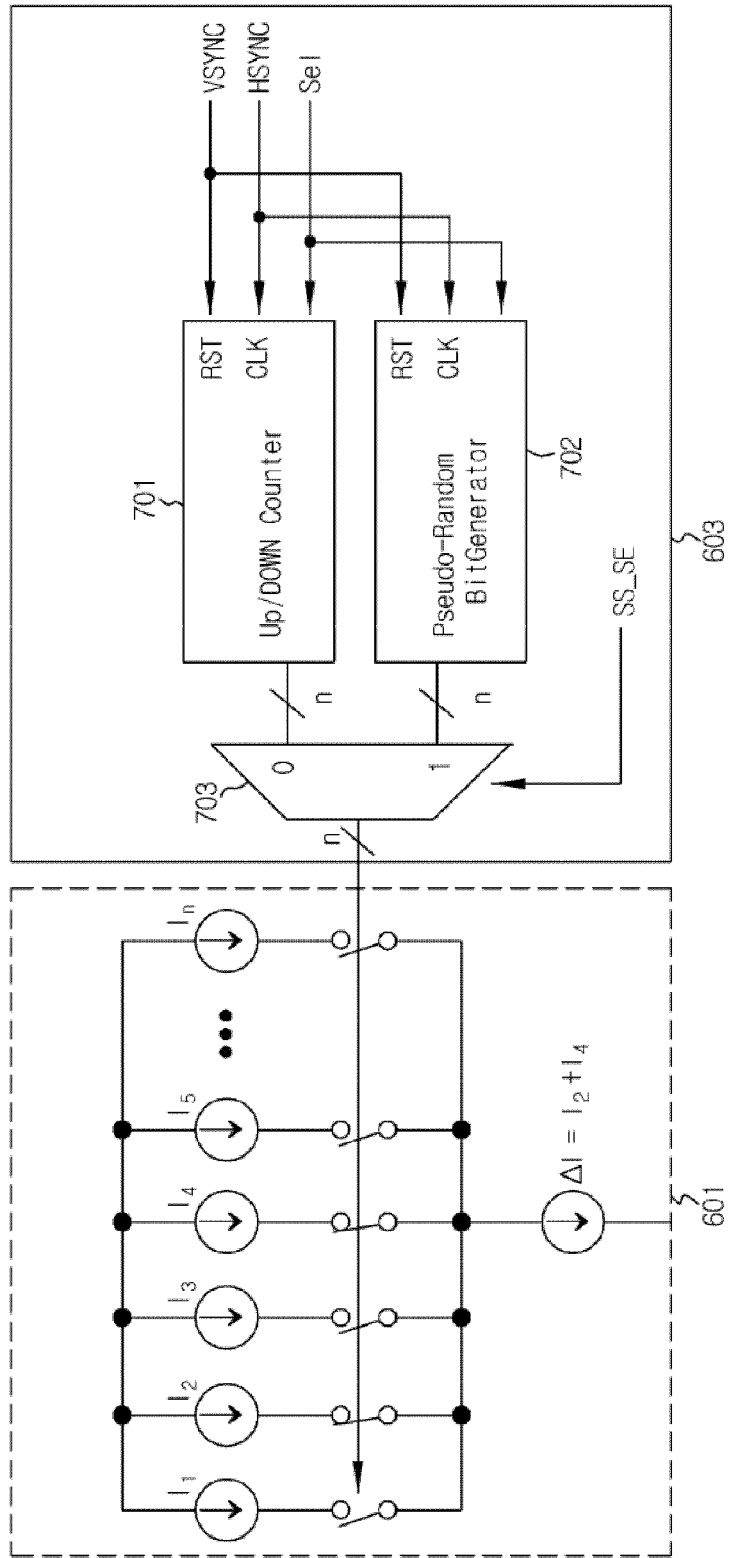
FIG. 7 is a detailed block diagram of a current source section and a counter section, shown in FIG. 6.

FIG. 7 is a view illustrating the configuration of the first current source section 601, the second current source section 602, and the counter section 603 according to an embodiment of the present invention. The first current source section 601 and the second current source section 602 have the same configuration, so only the first current source section 601 of the two current source sections is illustratively shown in FIG. 7.

The first current source section 601 includes a plurality of current sources I1 to In, which are connected in parallel with each other, and are connected in series with switches SW1 to SWn, respectively. The counter section 603 includes an up/down counter 701, a pseudo-random bit generator (PRBG) 702, and a multiplexer 703.

The first current source section 601 includes a plurality of current sources I1 to In, which are connected in parallel with each other, and are connected in series with switches SW1 to SWn, respectively, wherein the switches SW1 to SWn are turned on in response to an n-bit switching control signal output from the counter section 603, and outputs variable current according to the turned-on switches SW1 to SWn. For example, when the switches SW2 and SW4 of the switches SW1 to SWn are turned on in response to the switching control signal, the first current source section 601 and second current source section 602 output variable current of "ΔI=I2+I4."

The multiplexer 703 selects the output signal of the up/down counter 701 and the output signal of the pseudo-random bit generator 702 in response to a selection signal SS_SEL, and transfers the selected signal to the switches SW1 to SWn of the first and second current source sections 601 and 602.

Figure 8:
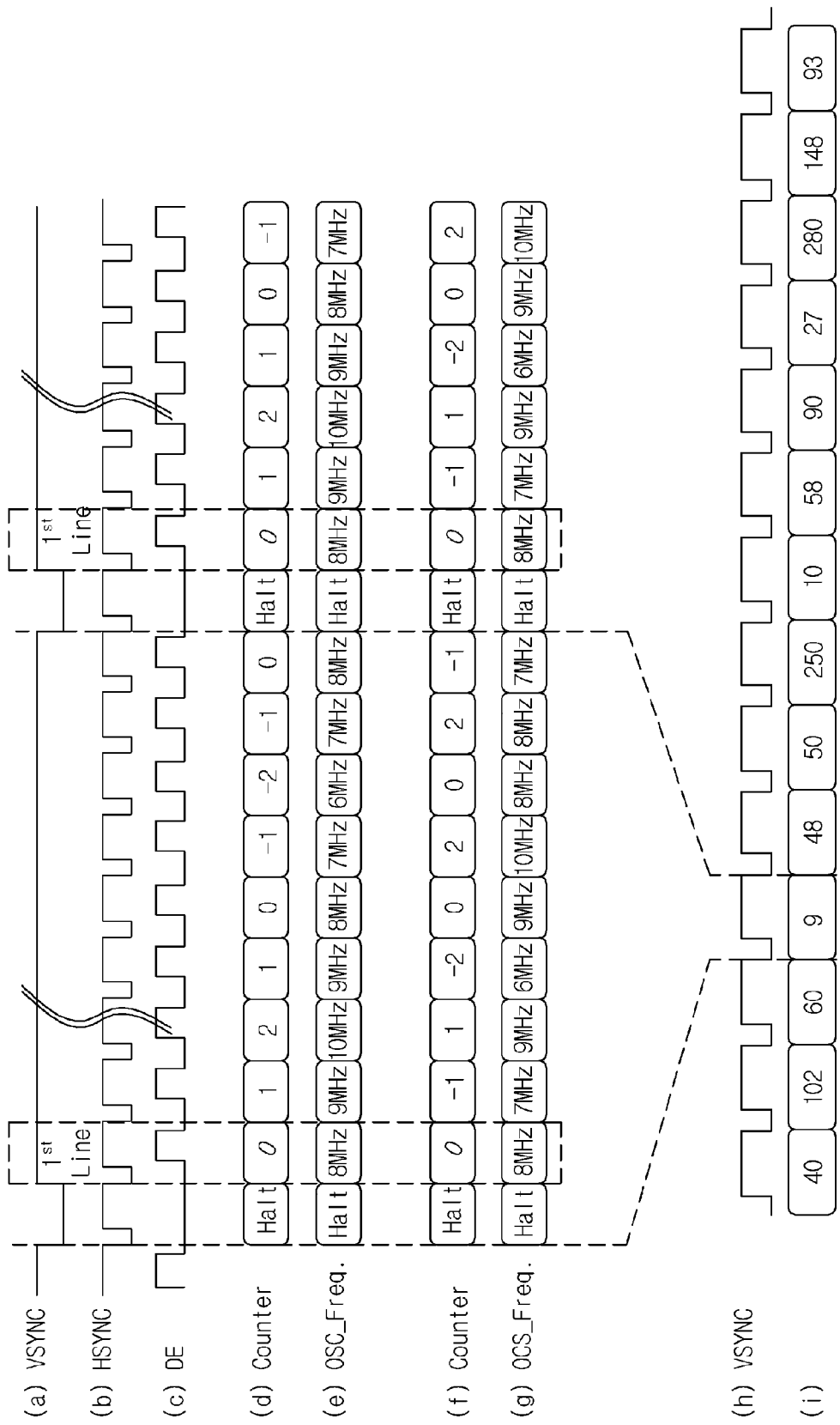
FIGS. 8(a) to 8(g) are waveform views illustrating the waveform at each component shown in FIG. 7.
FIG. 8(h) is a waveform view of a vertical synchronizing signal according to an embodiment of the present invention.
FIG. 8(i) is a view explaining a change in the output value of a counter section, which is determined by a vertical synchronizing signal and a horizontal synchronizing signal, according to an embodiment of the present invention.

As shown in FIGS. 8(a) and 8(b), whenever a first horizontal line of each frame is driven, the up/down counter 701 is reset in response to a vertical synchronizing signal Vsync, and outputs an n-bit switching control signal having a preset value. Thus, corresponding switches of the switches SW1 to SWn of the first and second current source sections 601 and 602 are turned on, so that the amount of current corresponding to the turned-on switches is output. Accordingly, the SR latch 606 outputs a corresponding frequency, for example, an oscillation frequency of 8 MHz as shown in FIG. 8(e), through the output terminal Q thereof.

Thereafter, the up/down counter 701 counts up or down a horizontal synchronizing signal Hsync or data enable signal DE, as shown in FIGS. 8(b) and 8(c), in a constant pattern as shown in FIG. 8(d), thereby outputting an n-bit switching control signal. Accordingly, the SR latch 606 outputs a variable frequency signal of the n bits, which periodically varies as shown in FIG. 8(e), through the output terminal Q thereof.

Also, as shown in FIGS. 8(a) and 8(f), whenever the first horizontal line of each frame is driven, the pseudo-random bit generator 702 is reset in response to a vertical synchronizing signal Vsync, and outputs an n-bit switching control signal having a preset value. Thus, corresponding switches of the switches SW1 to SWn of the first and second current source sections 601 and 602 are turned on, so that the amount of current corresponding to the turned-on switches is output. Accordingly, the SR latch 606 outputs a corresponding frequency, for example, an oscillation frequency of 8 MHz as shown in FIG. 8(g), through the output terminal Q thereof.

As described above, an oscillation signal having the same frequency is output whenever each frame begins, so that, when a variable frequency is used to reduce electromagnetic interference, an influence is not exerted on an image and a stable boosting operation can be ensured.

Thereafter, the pseudo-random bit generator 702 counts up or down a horizontal synchronizing signal Hsync or data enable signal DE, as shown in FIGS. 8(b) and 8(c), in a random pattern as shown in FIG. 8(f), thereby outputting an n-bit switching control signal. Accordingly, the SR latch 606 outputs a variable frequency signal of the n bits, which randomly varies as shown in FIG. 8(g), through the output terminal Q thereof.

In FIG. 7, a selection signal SEL causes the up/down counter 701 to select an up counting operation or down counting operation, and causes the pseudo-random bit generator 702 to select a random bit generation period.

FIGS. 8(h) and 8(i) show an example where the up/down counter 701 or pseudo-random bit generator 702 changes the count period thereof through the use of the selection signal SEL whenever a vertical synchronizing signal Vsync or horizontal synchronizing signal Hsync is input or whenever a random vertical synchronizing signal Vsync or random horizontal synchronizing signal Hsync is input. Through this, whenever receiving a vertical synchronizing signal Vsync or horizontal synchronizing signal Hsync or whenever receiving a random vertical synchronizing signal Vsync or random horizontal synchronizing signal Hsync, the up/down counter 701 or pseudo-random bit generator 702 changes the count period thereof, thereby spreading the energy spectrum generated by the boost converter. Accordingly, it is possible to reduce electromagnetic interference due to energy rising.

Figure 9:
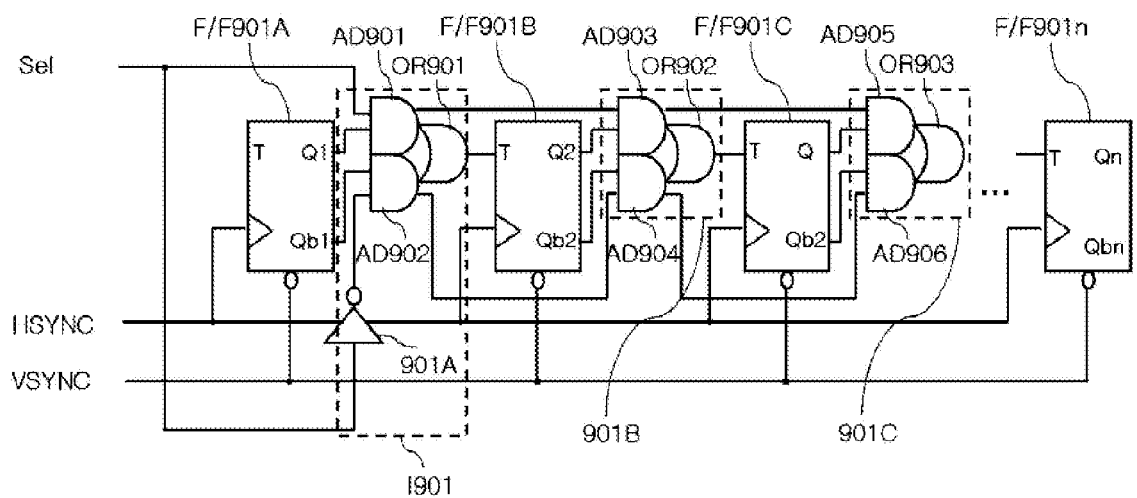
FIG. 9 is a detailed circuit diagram of an up/down counter according to an embodiment of the present invention.

FIG. 9 is a circuit diagram of the up/down counter 701 according to an embodiment of the present invention.

As shown in FIG. 9, the up/down counter 701 includes N-stage T flip-flops F/F901A to F/F901N, a first output signal operation module 901A, a second output signal operation module 901B, and third to N$^{th}$ output signal operation modules 901C to 901N. The clock signal terminals of the N-stage T flip-flops F/F901A to F/F901N are connected in common to the horizontal synchronizing signal terminal Hsync, and the clear terminals thereof are connected in common to the vertical synchronizing signal terminal Vsync.

The first output signal operation module 901A includes: an inverter I901 for inverting and outputting the selection signal SEL; an AND gate AD901 having first and second input terminals which are connected to the selection signal terminal SEL and the output terminal Q1 of the T flip-flop F/F901A, respectively; an AND gate AD902 having first and second input terminals which are connected to the inverted output terminal Qb1 of the T flip-flop F/F901A and the output terminal of the inverter I901, respectively; and an OR gate OR901 having first and second input terminals which are connected to the output terminals of the AND gates AD901 and AD902, respectively.

The second output signal operation module 901B includes: an AND gate AD903 having first and second input terminals which are connected to the output terminal of the AND gate AD901 and the output terminal Q2 of the T flip-flop F/F901B, respectively; an AND gate AD904 having first and second input terminals which are connected to the inverted output terminal Qb2 of the T flip-flop F/F901B and the output terminal of the AND gate AD902, respectively; and an OR gate OR902 having first and second input terminals which are connected to the output terminals of the AND gates AD903 and AD904, respectively.

The third to N$^{th}$ output signal operation modules 901C to 901N have the same construction as the second output signal operation module 901B, respectively, and are provided to the rear stage of the second output signal operation module 901B.

Figure 10:
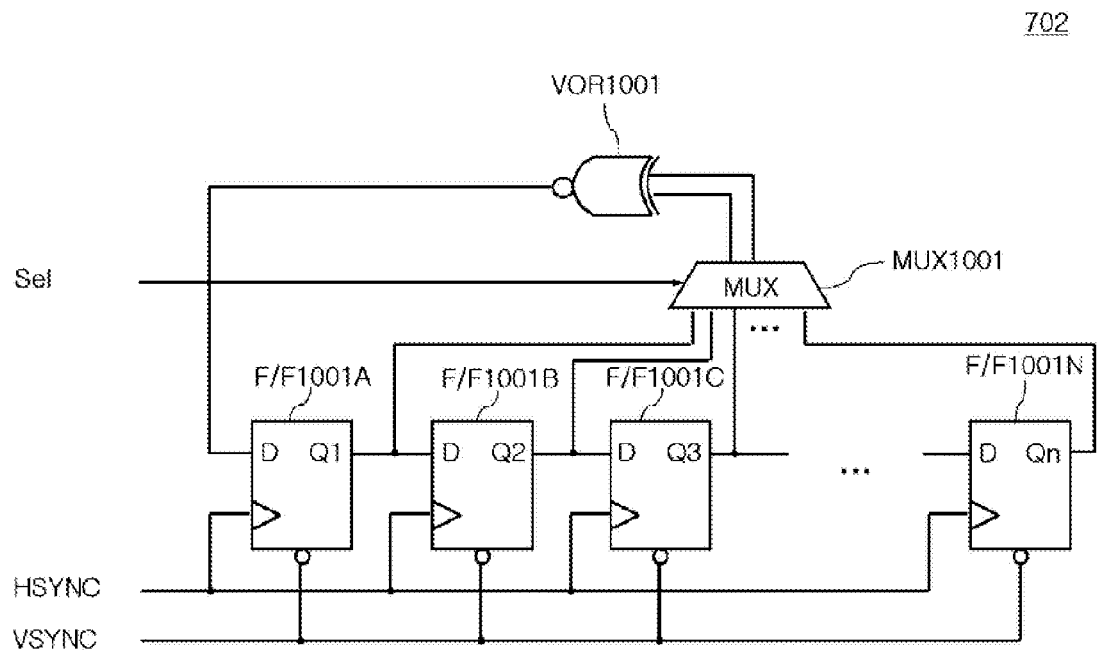
FIG. 10 is a detailed circuit diagram of a pseudo-random bit generator according to an embodiment of the present invention.

FIG. 10 is a circuit diagram of the pseudo-random bit generator 702 according to an embodiment of the present invention. As shown in FIG. 10, the pseudo-random bit generator 702 includes N-stage D flip-flops F/F1001A to F/F1001N, a multiplexer MUX1001, and an exclusive-OR gate XOR1001. The clock signal terminals of the N-stage D flip-flops F/F1001A to F/F1001N are connected in common to the horizontal synchronizing signal terminal Hsync, and the clear terminals CLR thereof are connected in common to the vertical synchronizing signal terminal Vsync.

The multiplexer MUX1001 selectively outputs the output signals of the output terminals Q1 to Qn of the D flip-flops F/F1001A to F/F1001N in response to a selection signal SEL.

The exclusive-OR gate XOR1001 performs an exclusive-OR operation on the output signals of the multiplexer MUX1001, and feeds a result of the operation back to the input terminal D of the first-stage D flip-flop F/F1001A.

Figure 11:
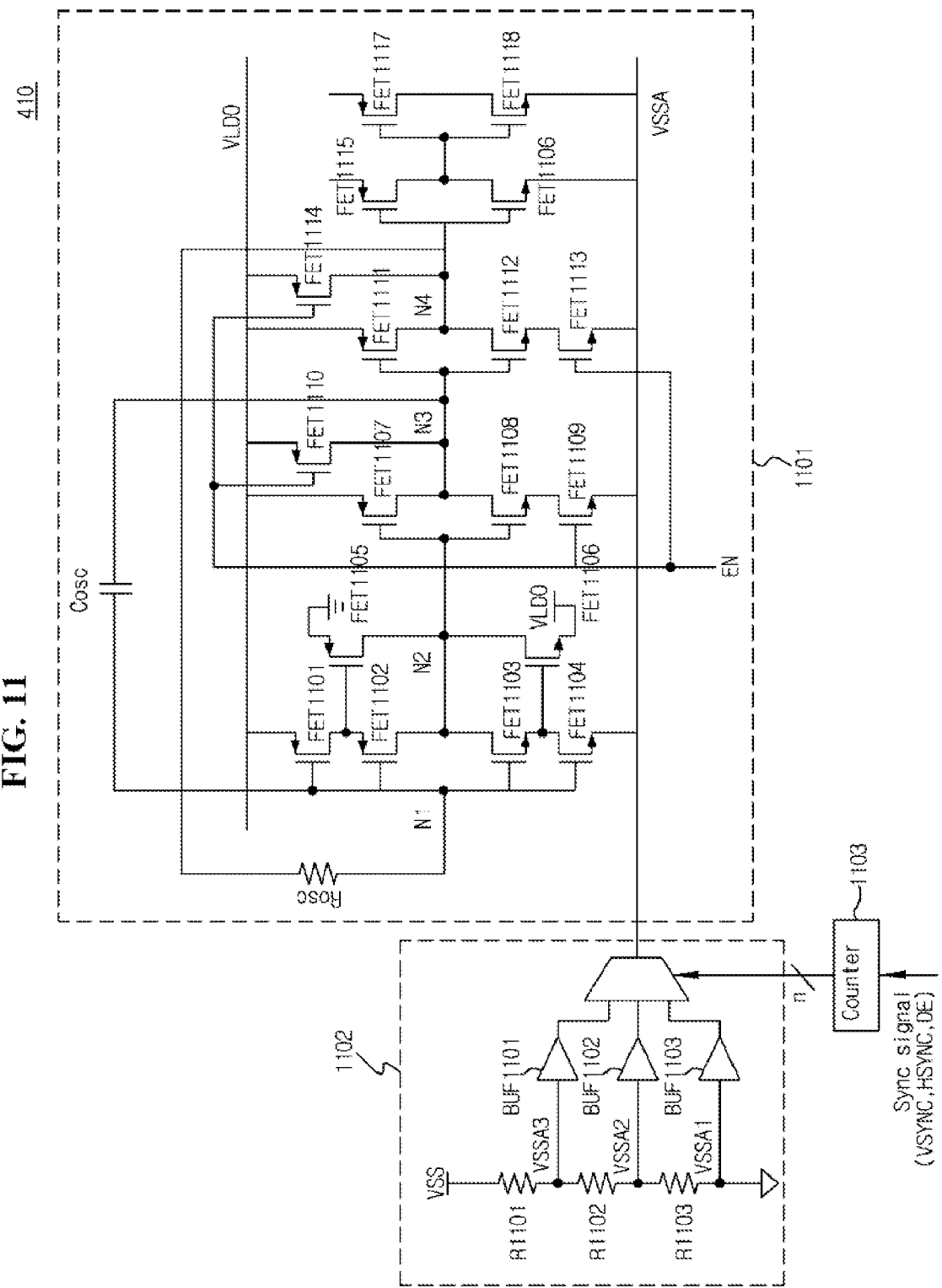
FIG. 11 is a circuit diagram illustrating the configuration of an oscillator according to a second embodiment of the present invention.

FIG. 11 is a circuit diagram illustrating the configuration of the oscillator 410 shown in FIG. 4 according to a second embodiment of the present invention. As shown in FIG. 11, the oscillator 410 may include an RC oscillation circuit 1101, a ground voltage generation section 1102, and a counter section 1103.

A first node N1 and a third node are connected via a condenser Cosc. Accordingly, when the third node N3 is at a high voltage level, the first node N1 is boosted to a voltage level corresponding to the high voltage level.

When the third node N3 is at a high voltage level, a transistor FET111 is turned off while transistors FET1112 and FET1113 are turned on, so that a fourth node N4 has the level of a ground voltage VSSA. Accordingly, electric charges of the condenser Cosc charged based on an RC time constant "Rosc·Cosc" are discharged to the fourth node N4.

Figure 12:
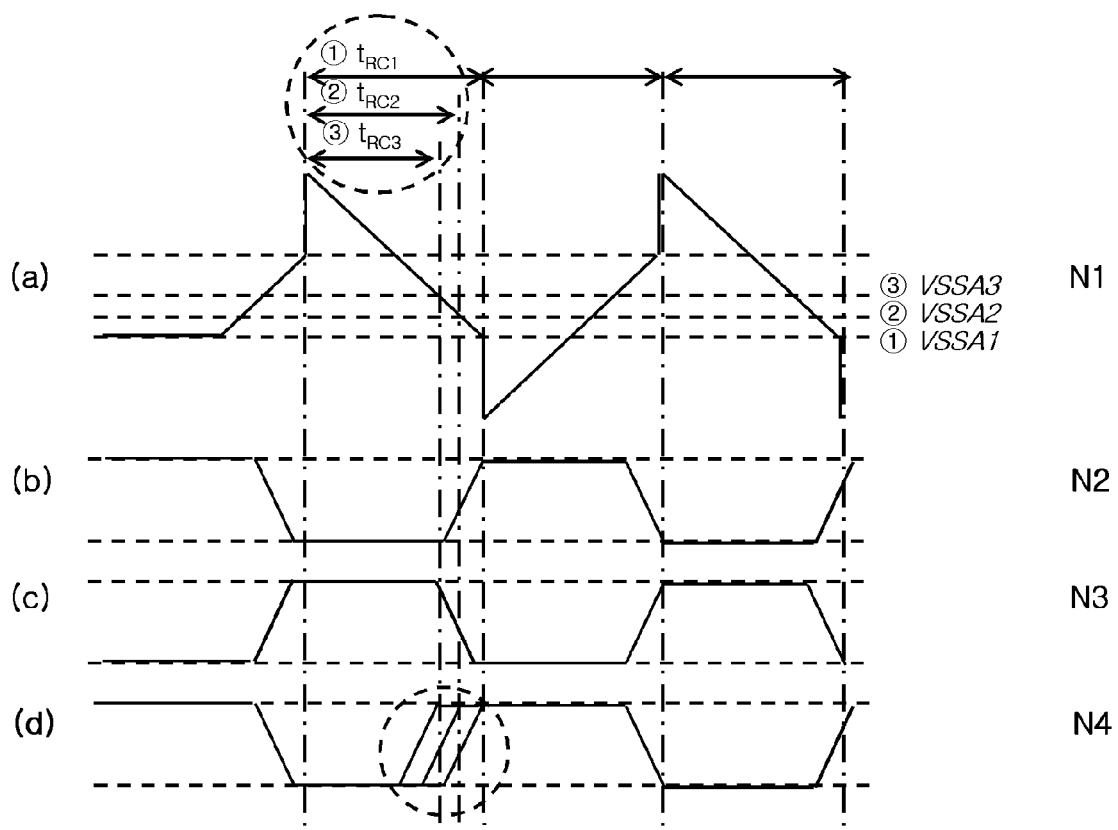
FIGS. 12(a) to 12(d) are waveform views illustrating the waveform at each component shown in FIG. 11.

The ground voltage generation section 1102 and counter section 1103 cause the ground voltage VSSA to vary to a ground voltage having a VSSA1, VSSA2, or VSSA3 level, as described later. When the voltage of the first node N1 exceeds (or falls below) a logic threshold voltage, as shown in FIG. 12(a), the voltage of a second node N2 rises, and the voltage of the third node N3 drops. In this case, since the fourth node N4 is at a high voltage level, the condenser Cosc is charged based on the RC time constant.

Such an operation is repeated, so that an RS oscillation operation is achieved. In this case, the oscillation frequency has twice the period of the RC time when the on-resistances of transistors are ignored.

Meanwhile, when a signal having a desired frequency is generated through the use of the RC oscillation circuit 1101, as described above, a spread spectrum is implemented by varying the ground voltage VSSA, as described below.

That is to say, first, a ground voltage VSS is divided into VSSA1, VSSA2, and VSSA3 levels through the use of series resistors R1101, R1102, and R1103 for division. Then, the voltages of VSSA1, VSSA2, and VSSA3 levels are buffered through buffers BUF1101, BUF1102, and BUF1103, and one of the voltages of VSSA1, VSSA2, and VSSA3 levels is selected by the multiplexer MUX1101 and is output to be the ground voltage VSSA of the RC oscillation circuit. In this case, by controlling a ground voltage selection operation of the multiplexer MUX1101 using the counter section 1103, it is possible to vary the oscillation frequency of the RC oscillation circuit. FIGS. 12(a) to 12(d) are waveform views showing an example where the phases of the first to fourth nodes N1 to N4 vary according to the ground voltages.

To this end, the counter section 1103 may be implemented in various manners. For example, the counter section 1103 may include an up/down counter and a pseudo-random bit generator, as shown in FIG. 7, to be driven in synchronization with various synchronizing signals (e.g. Vsync, Hsync, DE, etc.), as described above. Accordingly, the frequency of an oscillation signal generated by the RC oscillation circuit 1101 varies, so that a spread spectrum is implemented. Therefore, it is possible to reduce electromagnetic interference, while ensuring a stable boosting operation which does not exert an influence on an image.

Figure 13:
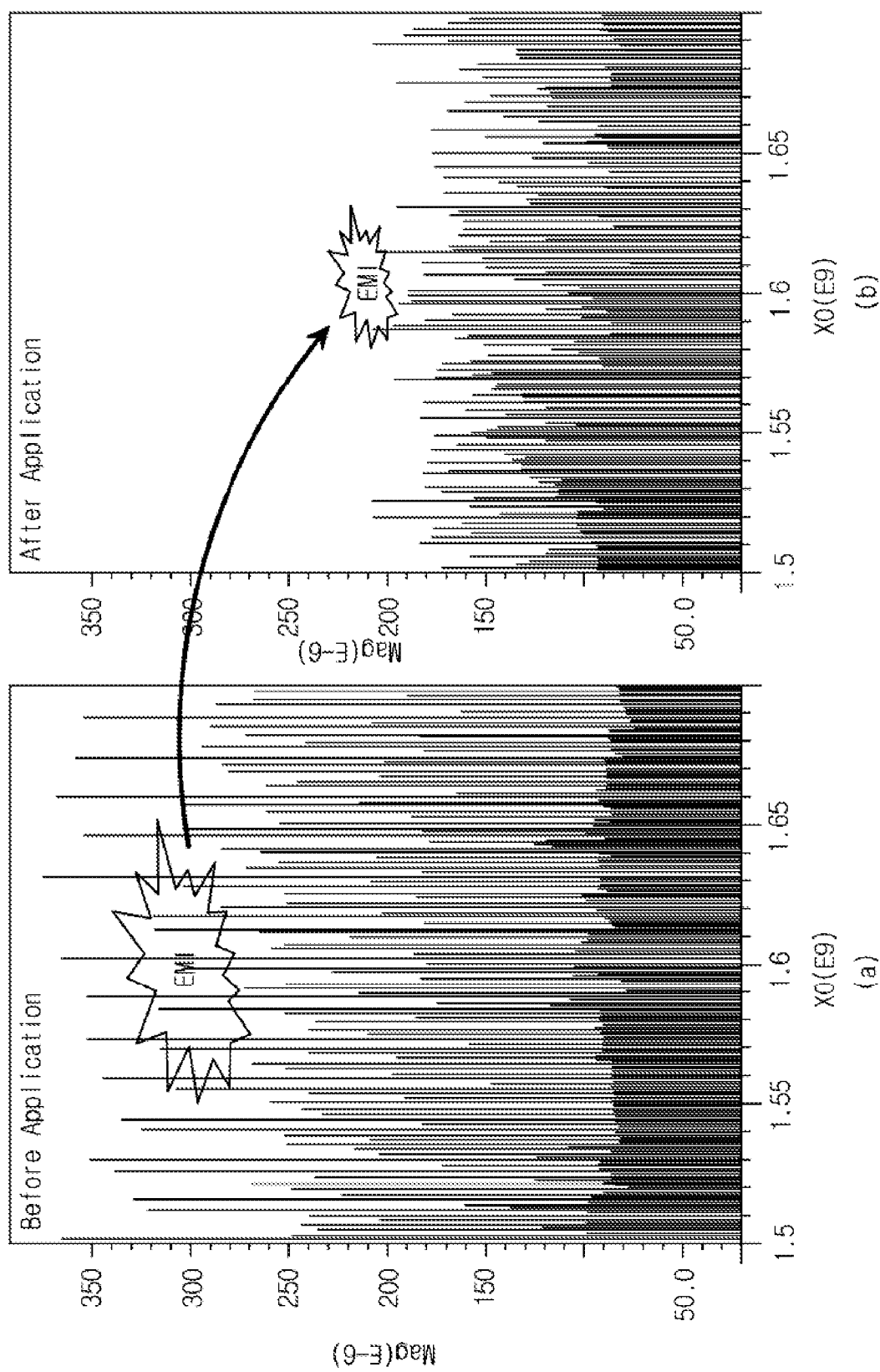
FIG. 13(a) is a view showing a result of a simulation for checking electromagnetic interference (EMI) generated by the conventional boost converter circuit.
FIG. 13(b) is a view showing a result of a simulation for confirming that electromagnetic interference (EMI) is reduced in the boost converter circuit according to an embodiment of the present invention.

FIG. 13(*a*) is a view showing a result of a simulation for checking electromagnetic interference (EMI) generated by the conventional boost converter circuit, and FIG. 13(*b*) is a view showing a result of a simulation which confirms that electromagnetic interference (EMI) is reduced in the boost converter circuit according to the present invention.

Figure 14:
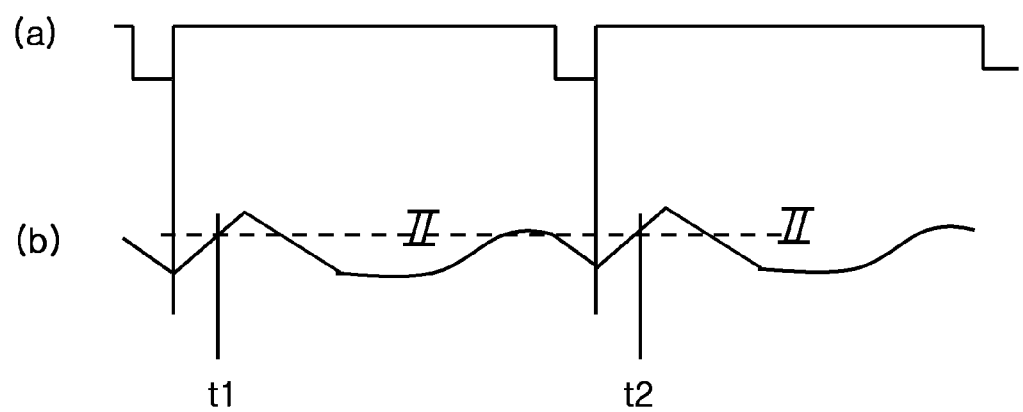
FIGS. 14(a) and 14(b) are waveform views showing the fact that it is possible to drive a panel with the same panel driving voltage at the same phase t1 and t2.

FIGS. 14(*a*) and 14(*b*) are waveform views showing the fact that it is possible to drive a panel with the same panel driving voltage through the use of a synchronizing signal whenever each frame begins according to the present invention. For reference, FIG. 14(*a*) is a waveform view of a vertical synchronizing signal Vsync, horizontal synchronizing signal Hsync, or data enable signal DE, and FIG. 14(*b*) is a waveform view of a positive/negative panel driving voltage VDDP/VDDN.

As is apparent from the above description, the present invention provides a boost converter of an LDI, which reduces electromagnetic interference by generating a panel driving voltage through the use of a variable frequency, and uses the same frequency whenever each frame begins, so that the boosting operation can be stably performed without exerting an influence on images.

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A boost converter of a liquid crystal display, wherein a transistor performing a switching operation in response to a switching pulse causes a reactor to be driven to generate a panel driving voltage, the boost converter comprising:
   an oscillator configured to generate an oscillation signal having a frequency, which varies in a predetermined pattern or randomly hops around a center frequency, in synchronization with a synchronizing signal, the oscillation signal also having the same frequency whenever each frame begins;
   a controller configured to output a switching signal for generating a required panel driving voltage through use of the oscillation signal output from the oscillator, a voltage detected as the panel driving voltage, and a preset reference voltage; and
   a driver configured to perform the switching operation on the transistor, which drives the reactor generating the panel driving voltage, through use of the switching signal output from the controller,
   wherein the oscillator comprises:
      first and second current source sections configured to output a variable current;
      a counter section configured to count the synchronizing signal, and to vary an output current of the first and second current source sections through use of a counted value;
      a set-signal output section configured to change a charge voltage so as to correspond to the output current of the first current source section, to compare the changed charge voltage with a first reference voltage, and to generate a set signal according to a result of the comparison;
      a reset-signal output section configured to change a charge voltage so as to correspond to the output current of the second current source section, to compare the changed charge voltage with a second reference voltage, and to generate a reset signal according to a result of the comparison; and
      an SR latch configured to generate an output signal and an inverted output signal in the form of a square wave according to the set signal and the reset signal output from the set-signal output section and the reset-signal output section, respectively, and to control the output current of the first and second current source sections through use of the output signal and the inverted output signal, and
   wherein the counter section comprises:
      a pseudo-random bit generator configured to be reset by a vertical synchronizing signal whenever each frame begins, to output an n-bit switching control signal having a preset value, and then to count up/down a horizontal synchronizing signal or a data enable signal in a random pattern, thereby outputting an n-bit switching control signal, where n is a positive integer.

2. The boost converter according to claim 1, wherein each of the first and second current source sections comprises:
   a plurality of switches configured to be controlled by the counter section; and
   a plurality of current sources configured to be connected in series to the plurality of switches, respectively, and to be connected in parallel with each other.

3. The boost converter according to claim 1, wherein the counter section comprises:
   an up/down counter configured to be reset by the vertical synchronizing signal whenever each frame begins, to output an n-bit switching control signal having a preset value, and then to count up/down a horizontal synchronizing signal or a data enable signal in a predetermined pattern, thereby outputting an n-bit switching control signal; and
   a multiplexer configured to select and output an output signal of the up/down counter or an output signal of the pseudo-random bit generator in response to a selection signal.

4. The boost converter according to claim 3, wherein, in the up/down counter, an up/down count operation is determined depending on the selection signal.

5. The boost converter according to claim 3, wherein, in the pseudo-random bit generator, a random bit generation period is determined depending on the selection signal.

6. The boost converter according to claim 1, wherein the controller comprises:
   a panel-driving-voltage monitoring unit which comprises a first comparator configured to compare a detection voltage of the panel driving voltage with a reference voltage and to output a signal according to a result of the comparison, a second comparator configured to compare the detection voltage of the panel driving voltage with a reference voltage set for soft start and to output a second monitoring signal according to a result of the comparison, and an AND gate configured to perform an AND operation on the output signal of the first comparator and an output signal of an off-time counter and to output a first monitoring signal according to a result of the comparison;

an on-time counter configured to count an on-time period of an oscillation signal output from the oscillator after being reset by the vertical synchronizing signal;

the off-time counter configured to count an off-time period of an oscillation signal output from the oscillator after being reset by the vertical synchronizing signal; and an SR latch configured to receive the first monitoring signal output from the AND gate through a set terminal of the SR latch, to receive a signal output from the on-time counter through a reset terminal of the SR latch, and to output an error-corrected pulse having a form of a switching pulse.

* * * * *